United States Patent [19]

Huddleston

[11] Patent Number: 4,692,352
[45] Date of Patent: Sep. 8, 1987

[54] METHOD OF MAKING AN ADHESIVE TAPE
[75] Inventor: Elwyn G. Huddleston, Franklin, Ky.
[73] Assignee: The Kendall Company, Boston, Mass.
[21] Appl. No.: 857,692
[22] Filed: Apr. 29, 1986
[51] Int. Cl.$^4$ .............................................. B05D 5/10
[52] U.S. Cl. .............................. 427/208.4; 427/393.5; 427/398.1; 427/428
[58] Field of Search .............. 427/208.4, 398.1, 393.5, 427/428

Primary Examiner—Bernard D. Pianalto
Attorney, Agent, or Firm—Alvin Isaacs

[57] ABSTRACT

Novel system for incorporating a rubber crosslinking agent in a rubber-based adhesive formulation wherein the crosslinking agent is admixed with the adhesive formulation in a cavity transfer mixer, thereby providing significant manufacturing advantages.

Preferably, the crosslinker is incorporated in an oil or plasticizer vehicle.

26 Claims, 2 Drawing Figures

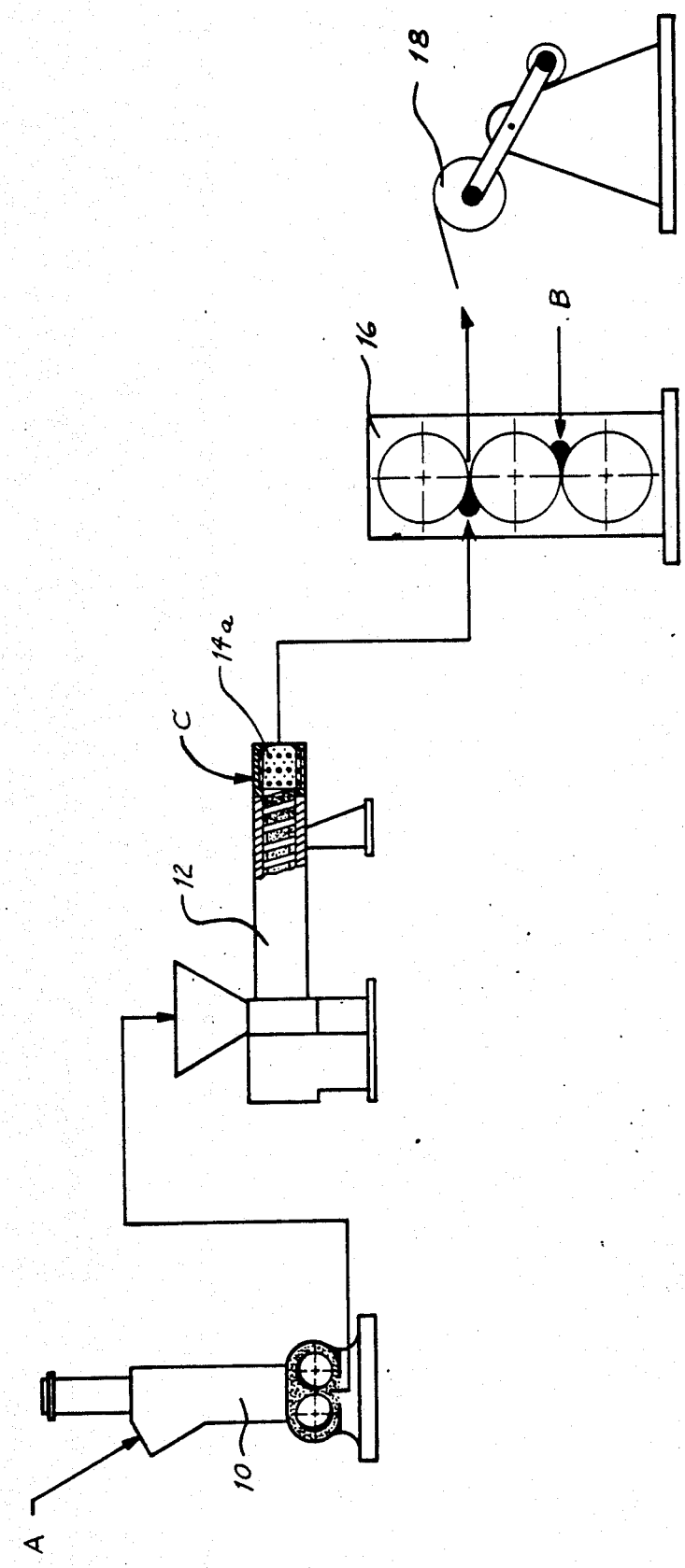

METHOD OF MAKING AN ADHESIVE TAPE

BACKGROUND OF THE INVENTION

This invention relates to novel procedures for including one or more materials in homogeneous rubber-based formulations, e.g. natural and/or butyl rubber formulations.

Since the invention is particularly useful in large-scale or industrial processes for incorporating a rubber crosslinking agent in rubber-based adhesive formulations, the invention will be described with particularity by reference thereto.

My copending applications Ser. Nos. 823,222 filed Jan. 28, 1986 and No. 843,943 filed March 25, 1986 relate to protective coating systems for metal surfaces, e.g. tubular articles such as metal pipes and the like, which systems comprise: (1) a rubber-based primer coating mixture; and (2) an adhesive tape comprising a backing material carrying a partially crosslinked rubber-based adhesive coating, the system further including a crosslinking agent and a crosslinking activator adapted to provide an in situ additional crosslinking of the system after the primer coating and tape are applied.

In the commercial manufacture of the adhesive coating in the aforementioned systems, it is customary to admix the rubber components, tackifier, and other ingredients in an internal mixer, typically a Banbury to provide a homogeneous adhesive mix.

However, it is not possible to include in this mixing procedure the crosslinking agent necessary for the in situ crosslinking subsequent to applying the primer coating and adhesive tape to the metal article to be protected. Were the crosslinking agent to be so included in the Banbury mix, the heat generated in the mixing operation would cause further crosslinking of the rubber to occur, thereby minimizing or precluding the desired subsequent incipient crosslinking.

Consequently, in the manufacture of adhesive formulations of the foregoing description it is necessary to incorporate the crosslinking agent downstream from the Banbury in a subsequent mixing step.

The typical procedure one skilled in the rubber art would employ to do so would be to transport the rubber mix from the Banbury (hereinafter referred to as the "premix") to a rubber mill where the crosslinking agent is then incorporated. During this milling step, the mix is necessarily maintained at elevated temperatures, as is understood in the art. Following admixture of the crosslinking agent, the heated mix is transported to a station for coating on the backing material. Typically, this is accomplished by calendering, after which the resulting adhesive tape is cooled and wound.

A particularly preferred material for providing the adhesive backing is a polyolefin such as polyethylene. This material is customarily provided to the calendering step in molten form, and preparation of the adhesive tape is thus effected with a three-roll calender, as will be described with more particularity hereinafter.

From the foregoing description it will be seen that the milling step is accomplished while the mix is in a heated state and this elevated temperature is necessarily maintained thereafter through the calendering operation for preparing the tape. If the calendering is delayed and/or the milled mix need be stored prior to calendering, a warming mill may be required to heat the mix for calendering.

Apart from such cost factors as manpower, equipment, space and energy consumption, the period in which the mix is heated (subsequent to milling and prior to cooling after calendering) inherently permits crosslinking induced by the presence of the crosslinker in the mix. This (unwanted) crosslinking in turn expends the crosslinking agent, thereby materially reducing the possibility for the desired in situ crosslinking.

In view of the foregoing, there is a clear need for improved manufacturing procedures for incorporating the crosslinker and thereafter rapidly coating the mix on the backing material and then cooling to a temperature where crosslinking prior to use is precluded.

The present invention provides a simple and elegant solution to this problem.

BRIEF DESCRIPTION OF THE INVENTION

In accordance with the present invention, the aforementioned objectives are accomplished by employing a cavity transfer mixer for incorporating the crosslinker or other additive in the premix in lieu of milling. The resulting homogeneous mix is extruded from the cavity transfer mixer and then transported directly to the calendering station to form the tape.

While the crosslinking agent may be supplied as an aqueous dispersion, superior results (in what may be regarded as a subinvention) are obtained when an oil or plasticizer is employed as the vehicle for incorporating the crosslinking agent into the cavity transfer mixer.

BRIEF DESCRIPTION OF THE DRAWINGS

FIG. 2 is a similar view illustrating the present invention.

DETAILED DESCRIPTION OF THE INVENTION

Figure 1:
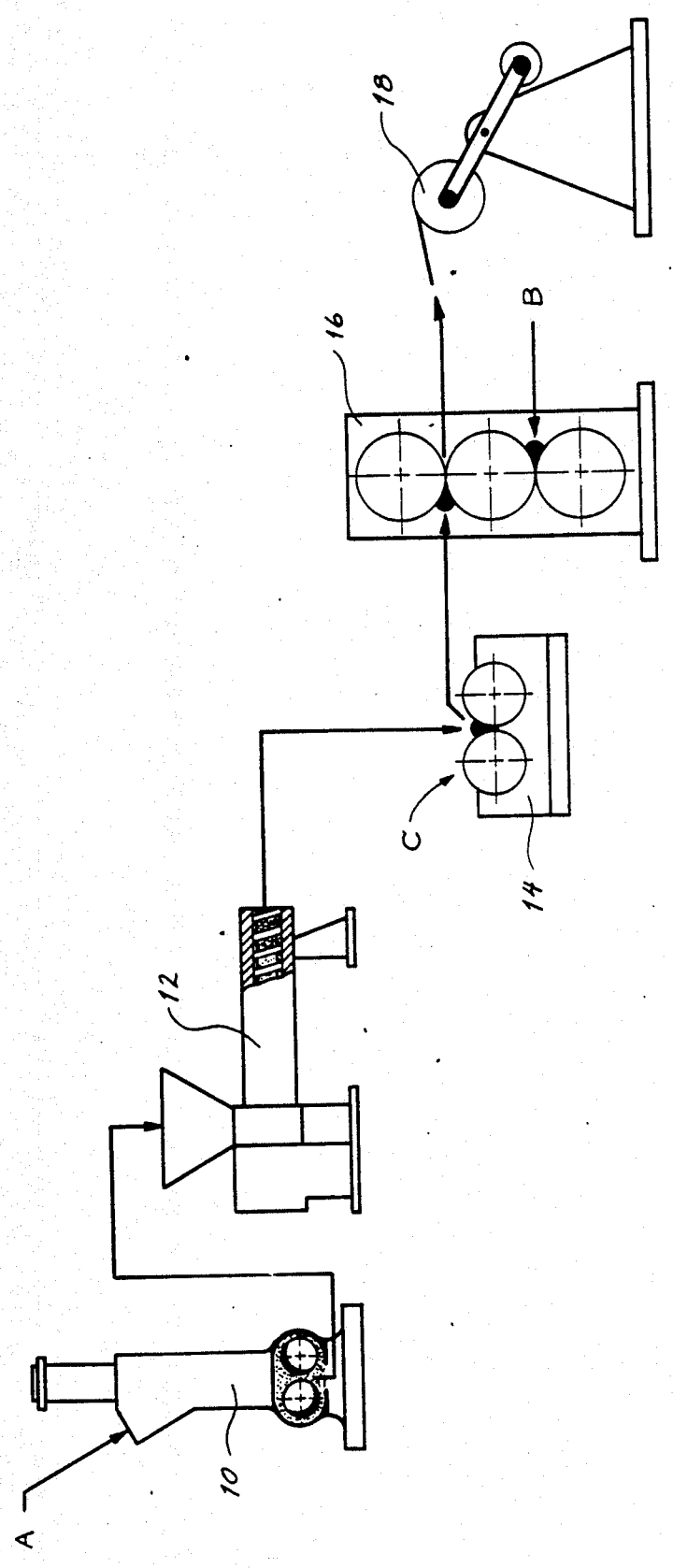
FIG. 1 is a schematic view illustrating the conventional system for forming an adhesive tape prior to this invention.

U.S. Pat. No. 4,472,231 issued Sept. 19, 1984 to Robert F. Jenkins is directed primarily to providing an improved anti-corrosion protective coating for the surface of metal pipes that are designed for inground implantation. According to the teachings of Jenkins, a two component interacting protective pipewrap system is provided consisting of: (1) a primer mixture comprising a blend of natural rubbers, resins and a crosslinking metal oxide activator coated with organo-titante; and (2) a rubber-based adhesive carried on an olefin polymer backing to be helically wrapped over the primer layer, the adhesive layer comprising a blend of virgin butyl rubber and reclaimed butyl rubber partially crosslinked with p-quinone dioxime crosslinking agent, a tackifier, and a residual amount of the p-quinone dioxime crosslinker. When the adhesive layer, containing unreacted p-quinone dioxime crosslinker, is placed in contact with the primer-coated pipe outer surface, a further crosslinking reaction then occurs at the primer-adhesive interface, as well as throughout the primer layer and the adhesive layer. This additional crosslinking, which is aided in part by the elevated temperature of the operating pipeline and its contents, results in an improved ability of the system to resist tape creep caused by high shear forces.

As described in the patent, the crosslinking agent is incorporated in the adhesive during Banbury mixing of the adhesive coating composition; and in a second adhesive mixing step, generally performed on a two roll mill, an additional quantity of crosslinking agent is then incorporated. As described in the Example (Col. 6), mixing on the two roll mill was for about 20 minutes at 200° F.

While the patented system was satisfactory in small-scale manufacture, it was found to be impractical in the larger scale commercial manufacture of the system. Specifically, in attempts to scale-up for manufacture, it was found that the operating conditions taught in the patent do not provide a procedure which is processable in an internal mixer such as a Banbury Mixer in the commercial production of the adhesive. Repeated attempts to implement the teachings of the '231 patent on production equipment immediately resulted in a lumpy adhesive.

My aforementioned copending applications, Ser. No. 823,222 and 843,943 relate to what can be said to be alternate solutions to this lumping problem, which solutions are in part predicated upon the discovery that the problem was caused by the particular crosslinking agent, p-quinone dioxime, employed in the patented process. Specifically, it has been discovered that this crosslinking agent reacts so quickly under processing conditions in the mixer that there is not sufficient time to proper dispersion to avoid lumping.

In general, as stated previously, the copending cases can be described as relating to protective coating systems comprising: (1) a rubber-based primer coating mixture; and (2) an adhesive tape comprising a backing material carrying a partially crosslinked rubber-based adhesive coating, the system further including a crosslinking agent and a crosslinking activator adapted to provide an incipient or in situ additional crosslinking of the system after the primer coating and tape are applied. Preferably, as described in the Jenkins patent, the crosslinking agent for the in situ crosslinking is present in the adhesive and the activator in the primer.

More specifically, Ser. No. 823,222 solves the problem by employing a pre-crosslinked butyl rubber in lieu of partially crosslinking in the Banbury, and then mixing in the requisite amount of crosslinking agent to affect the in situ additional crosslinking at some time after removal of the initial mix (premix) from the Banbury. As described therein, the rubber components to be admixed with the tackifier and other ingredients in the Banbury to form a substantially homogeneous premix will consist of a partially pre-crosslinked virgin butyl and a [non-crosslinked] virgin butyl rubber. Optionally a portion of the virgin butyl may be, and preferably will be replaced with reclaimed butyl rubber, in which event the premix will contain a blend of partially crosslinked virgin butyl, non-crosslinked virgin butyl and reclaimed butyl rubber. The resulting premix will be effectively free of any crosslinking agent.

As stated in this application, the degree of partial crosslinking of the butyl rubber prior to mixing with the other components in the Banbury to form the premix dispersion may vary within a wide range to prove a coatable rubber-based adhesive formulation. It may, for example, be on the order of 35 to 75%.

In general, the proportions of partially crosslinked rubber in the total rubber blend will vary inversely to the percentage of crosslinking, i.e., the greater the percentage of crosslinking within the above-noted 35–75% range, the lesser amount of pre-crosslinked rubber is required in the premix. While the determination of the precise amounts which may be desired for optimum results will be within the expected judgment of the skilled worker in the light of this description, in general it may be said that the amount of partially crosslinked rubber to be employed in the premix will be on the order of from about 8 to about 48%, depending upon the degree of crosslinking, the remainder being virgin butyl or a mixture of virgin butyl and reclaimed rubber.

Following removal of the premix from the Banbury, an effective amount of a crosslinking agent for the desired in situ crosslinking is then incorporated in a separate mixing step. This crosslinking agent may be any of the per se known rubber crosslinkers, e.g. p-quinone dioxime, p-dinitrosobenzene, phenolic resin, etc. The adhesive mix containing the thus incorporated crosslinker is then transported to the coating station for preparation of the tape.

Copending application Ser. No. 843,943, on the other hand, relates to an alternate approach wherein the partially crosslinked premix is provided by crosslinking in the Banbury, as is done in the system described in the Jenkins' patent. However, a phenolic resin crosslinking agent is employed in lieu of the p-quinone dioxime of Jenkins to obviate the lumping problem. As described therein, the premix will comprise a mixture of virgin butyl rubber and/or halogenated butyl rubber alone or in combination with reclaimed rubber, the virgin and/or halogenated butyl rubber being partially crosslinked by the phenolic resin crosslinking agent. Like the earlier filed Ser. No. 823,222, the premix will also include the other usual additives for a rubber-based adhesive, e.g. tackifier, as well as antioxidants, bactericides, fillers and/or other reagents performing specific desired function. As stated therein, in the preferred embodiment the premix is then removed form the Banbury and conveyed downstream to a mill where it is mixed with the additional crosslinker, as in the earlier application, to provide the adhesive composition.

The phenolic resin crosslinking agents employed for the initial crosslinking of the premix may be any of the per se known phenolic resin rubber crosslinkers. As a class they are slower acting than p-quinone dioxime and will not cause the aforementioned "lumping" problem.

Specific illustrative phenolic resins for this purpose are disclosed in the aforementioned application and are incorporated by reference herein. In general, the amount of this crosslinker for preparing the premix will be from about 3 to about 10 phr.

To recapitulate, the aforementioned Jenkins' patent and my copending applications can all be said to disclose systems wherein various components of a rubber-based adhesive are admixed in an internal mixer, preferably a Banbury, to provide a partially crosslinked rubber premix; the rubber premix is removed from the internal mixer and transported to a second mixer, typically a two-roll mill where a quantity of crosslinking agent, e.g. p-quinone dioxime is admixed; and the resulting adhesive composition is then coated onto a backing material, typically by calendering, to provide an adhesive tape.

The manufacturing steps for forming the adhesive tape prior to the present invention may best be understood by reference to FIG. 1 of the accompanying drawings.

FIG. 1 illustrates the prior method for preparing the rubber-based adhesive tapes contemplated by this invention, i.e. the manufacturing procedures that one skilled in the rubber art would follow prior to this invention.

As shown therein the adhesive components, A, e.g. rubber, tackifier, and other ingredients, including, if any, crosslinking agent for partial crosslinking of the rubber, are fed into a Banbury mixer, 10. The resulting heated, homogeneous premix is removed from the Banbury and conveyed downstream in the manufacturing system through an extruder 12 to a mill, 14. Mill, 14 will typically be a conventional 84 inch two-roll mill with a stock temperature of about 210° F. During the milling step, a pre-measured quantity of the dry crosslinking agent, C, e.g. p-quinone dioxime is applied by means of a scoop of shovel. The average time for the milling is on the order of about ten minutes. While in theory, the milled adhesive mix could then be transported directly to the next step, calendering station 16, as a practical matter, in the described batch operation, the milled mix frequently sits in storage in pans for on the order of about fifteen minutes before being moved to the calender. As shown, calender 16 is a three-roll calender into which the molten backing material, B, e.g. polyethylene is fed from a source thereof (not shown). The calendering step, wherein the adhesive mix A and crosslinking agent from the milling step, is coated or layered onto the Backing sheet, B, takes on the order of three minutes. The resulting tape laminate is then rapidly fed through a series of cooling baths (not shown) to lower the temperature and is then taken up on wind-up roll 18. From the wind-up roll, the tape then proceeds through the final manufacturing steps, slitting, packaging, etc.

To summarize, the procedure illustrated in FIG. 1 may be regarded as a batch operation involving the essential steps of: (1) forming the premix in a Banbury; (2) adding the crosslinking agent in a milling step; and (3) calendering the resulting mix onto a backing material.

From the time the crosslinking agent, C, is added to the premix until the temperature is lowered by the cooling bath after calendering would be 13 minutes at the very least and more typically close to 30 minutes.

In the absence of any crosslinking activator or accelerator, there is still a temperature-time factor determining the rate of crosslinking in the presence of a crosslinking agent. Stated simply, even where no activator is present, crosslinking will commence at the particular temperatures employed in the mixing and calendering steps, e.g. temperatures on the order of 200° F. and greater. Thus, the longer these temperatures are maintained, the more (unwanted) crosslinking will occur in the manufacture.

Applicant has observed that it is generally most desirable if not essential that the interval between addition of crosslinking agent and cooling to a temperature where crosslinking will not occur be no greater than about ten minutes and ideally much less. During such a brief interval, crosslinking will be minimal or within acceptable limits. With greater intervals, the percentage of rubber available for the contemplated in situ crosslinking will be markedly reduced as will, of course, the amount of available "unspent" crosslinking agent.

To a degree, therefore, compensation may be made for this unwanted crosslinking by initially incorporating more crosslinking agent than needed for the in situ crosslinking and/or by employing a lesser degree of pre-crosslinked rubber initially. However, it will be apparent that the employment of such tactics will inherently produce less consistency and predictability from batch-to-batch and should accordingly be avoided.

The task of the present invention can therefore be described as being to find an improved manufacturing system which is more efficient and predictable, and which will very significantly lower the aforementioned interval between addition of the crosslinker and cooling, thereby effectively precluding premature further crosslinking of the rubber.

In accordance with the present invention, this task has been solved in an elegant and highly efficient manner by incorporating the crosslinking agent by means of a cavity transfer mixer in lieu of the conventional mill. Preferably, the manufacturing process will be continuous rather than the previously described batch operation, that is, premix from the Banbury is continuously transported to the cavity transfer mixer (CTM) and from there to the calendering station for manufacture of the tape.

Cavity transfer mixers are per se old and have been employed in various mixing operations, none of which is suggestive of the use contemplated by the present invention, nor of the advantages obtained thereby.

In general, cavity transfer mixers are a form of extruder mixer wherein material is fed into one end and exits through an extruder die at the opposed end. They consist essentially of a hollow cylindrical stator member and a cylindrical rotor member which is rotatable therewithin. The facing cylindrical surfaces on the rotor and stator carry respective pluralities of rows of grooves or cavities positioned so as to cause a mixing as the material traverses the mixer.

British Specification No. 930,339 describes a cavity transfer mixer of this description wherein the grooves are elongate and longitudinally extending. The rows of grooves on each member extend peripherally around the member and are spaced apart axially, the rows on one member being axially offset from the rows on the other member so as to provide an axial overlap of the grooves in adjacent rows on the stator and rotor. Because of this arrangement of overlapping closed cavities on the rotor and stator, material passing through this mixer must travel a path which alternates between rotor and stator cavities. Where a cavity on one member happens to be opposite a land on the other member, the material to be admixed is subjected to simple shear so that it is cut in half before being displaced approximately at right angles to its original direction as it passes into the next cavity.

U.S. Pat. No. 4,419,014 relates to an improved CTM which is particularly efficaceous in the practice of the present invention. In accordance with this patent, the rotor and stator cavities are formed as hemispheres arranged in a special configuration. Specifically, these hemispherical cavities are arranged in parallel rows on the rotor and stator such that: (a) the cavities in adjacent rows on the stator are circumferentially offset; (b) the cavities in adjacent rows on the rotor are circumferentially offset; and (c) the rows of cavities on the stator and rotor are axially offset, whereby an overall increase in mixing capacity for the same surface area can be obtained while achieving a desired exponential mixing characteristic in which simple shear mixing is repeatedly interrupted by cutting and turning stages.

The CTM disclosed in the aforementioned U.S. Patent is appreciably more efficient than that described in the British Patent. Specifically, the mixing capacity for the same surface area is considerably increased. Moreover, other significant advantages are obtained. The configuration of the hemispherical cavities can be arranged so that overlaps occur between three cavities at any given time so that extra mixing or blending is obtained by repeated division of the melt streams. The hemispherical shape of the cavities provides excellent streamlining so that, for example, stagnation will not occur. Other advantages are described in Col. 3.

The present invention employing a CTM in lieu of a two-roll mill is illustrated in FIG. 2.

As shown therein, the rubber and other components, A, for forming the premix are admixed in a Banbury in a batch operation as in the prior procedure as illustrated in FIG. 1.

The premix is then transported downstream (in the direction of the arrows) to the input opening of extruder 12.

As shown, a CTM 14a is secured, e.g. threaded, onto the exit end of extruder 12. CTM 14a may, for example, be on the order of four inches in length, have four rows of cavities and an internal diameter on the order of about four inches. The CTM is provided with an injection port where the crosslinker, C, is fed as shown by the arrow in a manner to be described in more detail hereinafter.

In lieu of having the CTM secured to the extruder, as illustrated, it may be a separately driven variable speed CTM mounted and secured contiguous with the exit port of the extruder, e.g. by clamping means. While the CTM has been shown, for purposes of illustration, as having the same diameter as the extruder, its diameter may be significantly greater, thereby providing greater surface area for mixing in the CTM, which in turn allows the addition of larger quantities of additivies, i.e. increases output.

Preferably, the process is operated as a continuous one where the premix from the Banbury 10 drops directly into continuously operating extruder 12 and metered amounts of crosslinker, C, are automatically fed into CTM 14a with the aid of per se known microprocessors. In other words, since the amount of premix exiting from the Banbury in a given batch time, e.g. 10 minutes is known, as is the rate of passage of the premix through the extruder 12, the required amount of crosslinker, C, to be admixed can be determined and automatically metered into the CTM 14a as the premix is continuously fed therethrough.

In this manner, employing a CTM in lieu of the 84 inch two-roll mill, a homogeneous adhesive mixture containing the crosslinker is instantaneously obtained and this premix may be immediately conveyed to calender 16 where the adhesive on backing layer, B, is formed and the resulting tape is then conveyed through the cooling baths (not shown) to windup 18.

In this manner, the lapse time between admixture of the crosslinker to cooling to a "safe" temperature where unwanted crosslinking cannot occur is on the order of three minutes, rather than the approximate 30 minutes required in the previously described prior procedures.

In addition to this time factor, which completely obviates the unwanted premature crosslinking which is the main task of the present invention, certain other extremely significant manufacturing advantages are obtained.

The resulting adhesive is considered to be smoother and for this reason superior. Less manpower, equipment, space and energy consumption is required, thus providing a very substantial cost reduction.

In addition, the use of a CTM provides superior environmental conditions in two significant ways.

First, in the earlier system as previously described, the powdery crosslinker is scooped onto the milling mass of adhesive. Considerable amounts of this powdery material escape into the ambient atmosphere. The present invention, on the other hand, can be said to be a system where all mixing occurs in internal-type mixers, thus avoiding these problems.

Secondly, there is the safety factor. While serious plant injuries are few, by far the most prevalent cause of those serious which occur is the milling operation. Because of human error, a worker will on occasion get an arm caught in the mill, resulting in extremely serious injury. Such tragic occurrences, while rare, can be completely avoided by the present invention.

As mentioned earlier, in the prior milling procedure, the crosslinking powder was simply scooped onto the milling mass. Because of the relatively long mixing time, the addition in this manner was both acceptable and standard. However, in the very brief mixing cycle in the cavity transfer mixer, it is necessary to incorporate the crosslinker in a liquid vehicle to achieve more rapid dispersion and admixture.

The method of so doing which would be apparent to those skilled in the art is both the simplest and most logical, namely introducing the powdered crosslinker in an aqueous slurry, e.g. a 50-50 mixture. From the standpoint of the mixing step alone, this is entirely satisfactory.

However, adding the crosslinker as an aqueous slurry has been found to cause certain problems which, from a manufacturing standpoint, particularly a continuous and automated system such as described above, render this method for incorporating the crosslinker unacceptable. Specifically, there was a problem of getting a good dispersion and a tendency for lumping to occur. This is particularly true with crosslinkers such as p-quinone dioxime, the preferred reagent which is granular and incompatible for admixture in this manner. Consequently, clogging of the mixing pump occurred.

Consequently, in the preferred aspect of this invention, a novel means for incorporating the crosslinker has been found which completely obviates these problems, which means can be said to be a sub-invention to the broader and basic concept of employing a cavity transfer mixer for incorporating the crosslinker.

In accordance with this preferred embodiment, the crosslinker is added in an oil or plasticizer liquid vehicle.

As examples of useful oils in which the crosslinker may be dispersed, mention may be made of paraffinic oils, e.g. lightweight fatty oils such as "Flexon 765" (trademark of Exxon), "Sunpar 2280" (trademark of Sun Petroleum Products), and Shellflex 371 (trademark of Shell Chemical).

Useful plasticizers include dioctyl phthalate, di-2-ethylhexyl adipate, diisooctyl adipate, butoxyethyl laurate, butyl oleate, butyl stearate, tributyl citrate, dibenzyl sebacate, di-2-ethylhexyl azelate, diethylene glycol mono-laurate, diglycol oleate, castor oil, etc.

In general, the ratio of liquid vehicle to crosslinker is not critical and may vary widely, consistent of course with cost and efficiency. By way of illustration, ratios within the range of 7:3 to 3:7 may be employed.

As will be apparent, the amounts so employed should be sufficient to incorporate effective amounts of crosslinker into the mix. [As used herein and in the appended claims, "effective amount" means an amount sufficient to provide the desired in situ crosslinker.] By way of illustrations, it has been found that on the order of from about 1.0% to about 3.0% by weight of the preferred crosslinking agent, p-quinone dioxime, based upon the total weight of the rubber components in the mix, is entirely satisfactory.

The following examples show by way of illustration and not by way of limitation the practice of this invention.

EXAMPLE 1

A 4 row Cavity Transfer Mixer as described in the aforementioned U.S. Pat. No. 4,419,014 was fitted with a plain screw onto the outflow end of a standard cold-feed extruder (a David Standard 15:1 L/D 60 mm (2½"). The extruder was provided with an injection port for introducing the crosslinker into the rubber mix prior to passage into the attached cavity transfer mixer. In the manner described in Example 1 of the aforementioned Ser. No. 823,222, a rubber adhesive premix was obtained in the Banbury comprising the following proportions of ingredients:

| | |
|---|---|
| Virgin Butyl Rubber | 81.0 lbs. |
| Reclaimed Butyl Rubber | 111.0 lbs. |
| Partially Crosslinked Butyl Rubber | 32.0 lbs. |
| Filler (McNamee Clay) | 246.0 lbs. |
| Polybutene Tackifier Resin | 64.0 lbs. |
| Aliphatic Hydrocarbon Tackifier Resin | 86.0 lbs. |
| Antioxidant | 2.5 lbs. |
| Bactericide | 31.0 gms. |

This premix was dropped from the Banbury into the extruder through which it was transported to the CTM, as described above. A 50-50 mixture of p-quinone dioxime in Flexon 765 was pumped into the injection port so as to provide an amount of crosslinker calculated at about three percent (3.0 phr) based upon the weight of the rubber components of the mix as it passed from the extruder into the cavity transfer mixer. Total elapsed time from the in-put of the premix into the extruder until exit from the CTM was about ten seconds. The resulting mix was then pumped directly to the calender (about 30 seconds) and the calendering operation to prepare the adhesive tape comprising the above-mentioned composition on a polyethylene backing took about three minutes, after which it was rapidly cooled by passage through cooling baths, as previously described and wound.

EXAMPLE 2

Example 1 was repeated, substituting for the premix of Example 1 a premix prepared in the manner described in Example 1 of the aforementioned Ser. No. 843,943 and which comprised:

| | |
|---|---|
| Virgin Butyl Rubber | 139.0 lbs. |
| Reclaimed Butyl Rubber | 47.0 lbs. |
| Phenolic Resin Crosslinker (SP-1055) | 16.0 lbs. |
| Magnesium Dioxide | 4.0 lbs. |
| Zinc Oxide | 19.0 lbs. |
| Filler (McNamee Clay) | 260.0 lbs. |
| Neoprene WRT | 9.0 lbs. |
| Polybutene Tackifier Resin | 93.0 lbs. |
| Aliphatic Hydrocarbon Tackifier Resin | 93.0 lbs. |
| Antioxidant | 3.0 lbs. |
| Bactericide | 28.0 gms. |

In each instance, a homogeneous adhesive tape was provided having the requisite physical properties and containing the prescribed proportions of unreacted crosslinker for providing the contemplated in situ crosslinking.

It will be seen from the foregoing description and illustrative examples that the present invention employing a Cavity Transfer Mixer in lieu of milling provides many significant advantages over the prior procedures, chief of which are: (1) obviating the unwanted crosslinking during manufacture; (2) lower cost; (3) less space; (4) better environmental conditions; and (5) less energy consumption.

While the invention has been described with respect to the admixture of a crosslinking agent (which can be said to be the main task of the invention), it will be readily apparent to those skilled in the art that the invention is not so restricted. It may be employed for the addition to a Banbury premix of any material which is reactive therewith at the particular temperatures employed for admixture and calendering.

In other words, the inventive concept described above will be equally applicable to the addition of other materials which are not intended to react with the premix during manufacture but which are in fact so reactive at the manufacturing temperatures and during the time between admixture and cooling which would heretofore be required when employing a milling step for admixture of the reagent.

By way of recapitulation, the present invention provides an elegant system for incorporating a material in a rubber-based premix at an elevated temperature at which the material is reactive with a least one component of the premix, coating the material onto a backing material while substantially maintaining reactive temperature and then cooling the resulting tape to a temperature where this material is no longer reactive, the time period between incorporating the material and cooling being so short that at best only minimal amounts of the incorporated material can react. In this context, Applicants cannot state unequivocally that this time period is so short that no portion of the incorporated material can react. Accordingly, as used herein and in the appended claims, the term "minimal amounts" means amounts which are so small as to be insignificant and unobjectionable, leaving substantially all of the incorporated material in its unreacted state while the invention is directed primarily to rubber mixes including at least one butyl based rubber, in its broadest aspects it is not so limited and may be employed in procedures for incorporating an additive into the other known rubber mixes, e.g. natural rubber, EPDM or mixtures of rubbers.

Since certain changes may be made without departing from the scope of the invention herein described, it is intended that all matter contained in the foregoing description, including the examples, shall be taken as illustrative and not in a limiting sense.

I claim:

1. In a method for making an adhesive tape comprising a backing sheet carrying a rubber-based adhesive wherein the rubber components of said adhesive are admixed at an elevated temperature at a first mixing station to form a premix for said adhesive; a material is incorporated in said premix at a second mixing station at an elevated temperature to form said adhesive; and said adhesive is thereafter coated onto said backing sheet at an elevated temperature, said material being reactive with at least one component of said premix at said elevated temperature;

the improvement comprising the steps of employing a cavity transfer mixer as said second mixing station; thereafter rapidly coating said adhesive onto said backing sheet to form said tape before any more than at most only minimal amounts of said material can react with said component; and rapidly cooling said tape to a temperature at which said material cannot react with said component.

2. A process as defined in claim 1 wherein said material is a crosslinking agent for rubber.

3. A process as defined in claim 1 wherein said crosslinking agent is incorporated in said cavity transfer mixer in an oil or plasticizer vehicle.

4. A process as defined in claim 3 wherein said vehicle comprises a paraffinic oil.

5. A process as defined in claim 3 wherein said crosslinking agent is p-quinone dioxime, p-dinitrosobenzene or a phenolic resin.

6. A process as defined in claim 1 wherein said adhesive is coated onto said backing sheet by calendering.

7. A process as defined in claim 6 wherein said backing sheet comprises a polyolefin.

8. A process as defined in claim 1 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit port thereof, said cavities being hemispherical and arranged in parallel rows on said rotor and stator such that: (a) the cavities in adjacent rows on said stator are circumferentially offset; (b) the cavities in adjacent rows on said rotor are circumferentially offset; and (c) the rows of cavities on said stator and rotor are axially offset, whereby an overall increase in mixing capacity for the same surface area is obtainable while achieving a desired exponential mixing characteristic in which simple shear mixing is repeatedly interrupted by cutting and turning stages.

9. A process for forming a rubber-based adhesive tape comprising the steps of admixing components of said adhesive, including at least one crosslinkable rubber component to form a partially crosslinked rubber premix; providing an extruder having an input port and an exit port, said extruder having a cavity transfer mixer secured contiguous with said exit port; transporting said premix at an elevated temperature to said input port of said extruder and causing it to traverse said extruder to said cavity transfer mixer while introducing a predetermined amount of rubber crosslinking agent into said premix prior to said premix passing from said extruder to said contiguous cavity transfer mixer; passing said premix containing said crosslinking agent through said cavity transfer mixer, whereby to mix said crosslinking agent with said premix to form said rubber-based adhesive; rapidly extruding said adhesive from said cavity transfer mixer at an elevated temperature; coating said adhesive onto a backing material at an elevated temperature to form said adhesive tape, said crosslinking agent being reactable with said rubber component to effect crosslinking thereof at said elevated temperature; and thereafter cooling said adhesive tape to a temperature at which said crosslinking agent is not so reactive with said rubber component, the time interval between said extrusion of said adhesive from said cavity transfer mixer and said cooling step being sufficiently short such that at most only minimal crosslinking of said rubber component can occur.

10. A process as defined in claim 9 wherein said crosslinkable rubber component is a member of the group consisting of virgin butyl rubber and halogenated butyl rubber.

11. A process as defined in claim 9 wherein said premix comprises a plurality of components including a blend of rubber components and at least one tackifier.

12. A process as defined in claim 9 wherein at least one rubber component of said premix is partially crosslinked.

13. A process as defined in claim 9 wherein said premix is a substantially homogeneous mixture formed by mixing the components thereof in an internal mixer.

14. A process as defined in claim 13 including the step of depositing said premix from said internal mixer directly into the input port of said extruder.

15. A process as defined in claim 9 wherein the input end of said cavity transfer mixer is threaded onto the output port of said extruder.

16. A process as defined in claim 9 wherein said cavity transfer mixer and said extruder are separately driven.

17. A process as defined in claim 16 wherein the diameter of said cavity transfer mixer is greater than the diameter of said extruder.

18. A process as defined in claim 9 wherein said crosslinking agent is incorporated in said premix dispersed in a liquid.

19. A process as defined in claim 18 wherein said liquid is a paraffinic oil or plasticizer.

20. A process as defined in claim 9 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit port thereof, said cavities being hemispherical and arranged in parallel rows on said rotor and stator such that: (a) the cavities in adjacent rows on said stator are circumferentially offset; the cavities in adjacent rows on said rotor are circumferentially offset; (c) the rows of cavities on said stator and rotor are axially offset, whereby an overall increase in mixing capacity for the same surface area is obtainable while achieving a desired exponential mixing characteristic in which simple shear mixing is repeatedly interrupted by cutting and turning stages.

21. A process for forming a rubber-based adhesive tape adapted for in sit crosslinking of a rubber component thereof at an elevated temperature comprising the steps of:
(1) forming in a Banbury internal mixer a substantially homogeneous premix including a crosslinkable butyl rubber and at least one tackifier;
(2) transporting said premix directly from said Banbury mixer to the input end of a continuously operating extruder;
(3) introducing a predetermined amount of rubber crosslinking agent into said premix as it traverses the extruder towards the output end thereof;
(4) passing said premix containing said crosslinking agent from said extruder to a cavity transfer mixer mounted and secured contiguous with the output end of said extruder, whereby to mix said crosslinking agent and premix homogeneously to form said crosslinkable adhesive;

(5) removing said adhesive from said cavity transfer mix at an elevated temperature at which crosslinking of said adhesive can occur, the degree of crosslinking being dependent upon the time said elevated temperature is maintained;

(6) rapidly calendering said adhesive onto a polyolefin backing material to form said adhesive; and (7) thereafter rapidly cooling said tape to a temperature at which crosslinking cannot occur, the time interval between introducing said crosslinking agent into said premix and said cooling step being such that a most only minimal crosslinking can occur.

22. A process as defined in claim 21 wherein said premix comprises a rubber blend selected from the group consisting of:
(1) pre-crosslinked butyl rubber, virgin butyl rubber and, optionally, reclaimed butyl rubber; and
(2) virgin butyl rubber, halogenated butyl rubber or a mixture of virgin butyl rubber and halogenated butyl rubber and, optionally, reclaimed butyl rubber, said rubber components being partially crosslinked.

23. A process as defined in claim 22 wherein said crosslinking agent is introduced into said premix dispersed in a liquid oil or plasticizer.

24. A process as defined in claim 22 wherein said cavity transfer mixer consists essentially of a hollow cylindrical stator member and a cylindrical rotor member rotatable therewithin, the facing cylindrical surfaces on said rotor and stator carrying respective pluralities of cavities positioned so as to cause a mixing as the material traverses the mixer from the entry port thereof to the exit prot thereof, savid cavities being hemispherical and arrnaged in parallel rows on said rotor and stator such that:
(1) the cavities in adjacent rows on said stator are circumferentially offset;
(2) the cavities in adjacent rows on said rotor are circumferentially offset; and
(3) the rows of cavities on said stator and rotor are axailly offset, whereby an overall increase in mixing capacity for the same surface area is obtainable while achieving a desired exponential mixing characteristic in which simple shear mixing is repeatedly interrupted by cutting and turning stages.

25. A process as defined in claim 24 wherein said extruder and said cavity transfer mixer are separately driven.

26. A process as defined in claim 25 wherein the diameter of said cavity transfer mixer is greater than the diameter of said extruder.

* * * * *